United States Patent Office 2,991,234
Patented July 4, 1961

2,991,234
ENAMELED ALUMINUM AND PROCESS FOR MANUFACTURE THEREOF
Joseph M. Andrus, Evanston, Ill., assignor to Croname, Incorporated, Chicago, Ill., a corporation of Illinois
No Drawing. Filed Aug. 11, 1958, Ser. No. 754,179
8 Claims. (Cl. 204—38)

This invention relates to enameled aluminum and particularly to aluminum surfaces that are wholly or partly coated with vitreous enamel.

Vitreous enamels have such exceptional qualities of sightliness, durability, resistance to corrosion, resistance to oxidation and discoloration due to aging, and resistance to abrasion or dulling from cleaning that they are commonly employed as a surface material. Recent developments in vitreous coatings have produced comparatively elastic enamels which may be bent, cut, punched, or otherwise worked without the characteristic vitreous breakage. In addition, recent developments have made possible low-melting vitreous enamels which may be applied to aluminum without the use of excessively high glazing temperatures. Some difficulties are encountered with vitreous enamels, however, which severely limit their usefulness.

One major problem in the use of vitreous enamels on aluminum is properly bonding the enamel to the metal. Improper bonding results in crazing, which is characterized by the enamel flaking off the metal surface. To obtain a permanent enamel-metal bond it has heretofore been necessary to employ elaborate metal surface preparation processes.

The metal cleaning processes to prepare the surfaces for a vitreous enamel give rise to a second difficulty. This difficulty is that the enamel must completely cover the aluminum surface rather than just a portion of it. The surface preparation processes yield a receptive surface but a relatively unstable one, so that partially covering it with enamel yields a surface which is partly decorative, resistant to oxidation, etc. but the uncovered portion of the surface is vulnerable to attack by oxygen or other corrosive or staining materials.

Another difficulty which is less serious is that the ordinary aluminum surface preparation processes result in a discoloration of the surface or at least in a residual discoloring material clinging to the surface. When dark enamels are employed, this will present no problem, but when color sensitiveness is involved, for example, when it is desired to employ white or transparent vitreous enamels, the discoloring propensities of the usually-employed surface preparing materials must be contended with.

It is an object of this invention to provide a novel process for applying a vitreous enamel coating to aluminum which process overcomes the above enumerated difficulties. It is another object of this invention to produce a novel composition of matter which has heretofore been impossible to produce by the known methods of applying vitreous enamel to aluminum. This novel composition, specifically, is an anodized aluminum surface that is partly coated with vitreous enamel.

Briefly, this invention resides in the discovery that an excellently bonded vitreous enamel may be applied to an anodized aluminum surface provided the anodized surface is prepared with certain limitations. This is an entirely unexpected result since the heretofore known and practiced methods for preparing an aluminum surface for enamel have as their end result the complete removal of oxide of any type from the surface and in fact, strict instructions to avoid applying vitreous enamel to anodized aluminum surfaces are usually found in the instructions for applying enamel to aluminum. I have found that anodized aluminum having an anodized oxide layer in a specific thickness range is not only a material that will accept a vitreous enamel, but it forms a non-crazing, non-spalling, water-resistant bond that is comparable to or superior to the best bonds formed by presently employed methods. The method of this invention not only yields an excellently bonded product but avoids most of the difficulties associated with manufacturing processes and is so flexible in its application that it gives rise to a whole new class of products.

The process of coating and firing the vitreous enamel leaves the anodized aluminum surface entirely unaffected; the anodized surface remaining stable and decorative. It thereby is possible to manufacture a composition consisting of aluminum metal having a surface which is partly anodized aluminum and partly vitreous enamel. This combination of stable and decorative surfaces is very useful, for example, when it is desired to produce an anodized aluminum plate upon which a design, a name, instructions, numbers, indicia of various kinds, or other markings of vitreous enamel are fixed. It is, of course, obvious that a vitreous enamel surface may be prepared with anodized aluminum numbers, words, etc. or any combination of these two may be obtained by known techniques of printing, screening, masking and other methods of application.

It is also possible to modify the process of this invention to produce a decorative surface which is partially vitreous enamel and partially dyed or pigmented anodized aluminum. As will be hereinafter discussed, the dyeing or pigmenting may be effected before or after application of the vitreous enamel to the anodized aluminum. Following are several examples which are presented for the purpose of illustrating various specific modes of practicing the process of this invention and which are presented for the purpose of illustrating typical embodiments of the invention rather than limiting the invention to the specific conditions and materials employed.

*Example 1.*—An aluminum sheet having an area of one square foot is prepared for anodizing by polishing it in a solution consisting of 80% by volume of 85% phosphoric acid, 15% by volume of glacial acetic acid and 5% by volume of 68% nitric acid. The sheet is polished by being immersed in this solution for two minutes while the solution is maintained at 200° Fahrenheit. The sheet thus prepared is connected as the anode in an electrolytic cell which contains an electrolyte consisting of 15% by weight of sulfuric acid. The sheet is maintained as the anode for a period of ten minutes with a current of ten amperes passing through the cell. As a result of the electrolysis, an anodized aluminum oxide film approximately 0.0001 inch thick is formed on the aluminum sheet. This film is then treated by immersing the sheet in 1% nickel acetate solution maintained at a temperature of 200° Fahrenheit and at pH of 5.6 for a period of five minutes, the latter treatment sealing the anodized aluminum oxide film and making it resistant to staining and penetration by liquids.

The anodized aluminum surface thus prepared is covered with a vitreous enamel "slip." The slip is an aqueous suspension of extremely finely divided vitreous material having the following composition:

| | |
|---|---|
| 10 to 18 mol percent PbO | 0 to 22 mol percent $Na_2O$ |
| 38 to 65 mol percent $SiO_2$ | 0 to 20 mol percent $K_2O$ |
| 5 to 12 mol percent $Li_2O$ | 0 to 11 mol percent $TiO_2$ |

The slip which coats the metal has a pasty consistency and remains an even coating while it is air-dried. After drying, the coated aluminum is fired at 1000° Fahrenheit for ten minutes after which the vitreous enamel has glazed and the piece is permanently enameled and ready for use.

*Example 2.*—Example 2 is presented to illustrate the process of this invention employed with a partially coated anodized aluminum which is pigmented. In Example 2 a piece of aluminum sheet one square foot in area is anodized in accordance with the procedure set forth in Example 1, however, prior to sealing of the anodized aluminum surface it is pigmented by precipitating ferric hydroxide within the anodized film. Pigmenting is accomplished by soaking the anodized aluminum sheet in a 3% solution of ferric ammonium oxylate maintained at a temperature of 150° Fahrenheit for three minutes. Ferric hydroxide is precipitated and it imparts a yellow-gold color to the anodized film which is locked in by a sealing process as described in Example 1. There results from this pigmenting process a yellow-gold anodized aluminum sheet which may be partially or completely coated with vitreous enamel by coating it with a slip and firing as described in Example 1. Examples of other pigments which may be employed are a yellow color produced by saturating the anodic film with potassium chromate and then treating with lead acetate to precipitate lead chromate and a brown color produced by treating the anodic film with potassium chromate and then with silver nitrate to precipitate silver chromate.

*Example 3.*—Example 3 is presented to illustrate the process of this invention wherein the anodic film is dyed with an organic dye to impart color to it. This process is effected by first producing sheet aluminum with an anodic film as described in Example 1. The anodized aluminum, prior to sealing, is partly covered with a suitable slip and then heated to 1000° Fahrenheit to effect glazing of the slip. The partially covered and glazed anodized aluminum is then dyed with an organic dye to impart color to the exposed anodic film. Following the dyeing which is effected by merely immersing the sheet of aluminum in a bath of a suitable dye, the film is sealed by the process heretofore described and the color is then locked into the film and invulnerable to attack by agents other than those affecting the anodic film. Organic dyes decompose at the glazing temperature and they accordingly must be applied subsequent to extremely high temperature treatment, however, inorganic pigments are unaffected by the high glazing temperature and may be incorporated into the anodic film at any time.

The anodized aluminum oxide film cannot be subjected to extremely high temperature or it will craze much as a glass coating. The firing temperature that an anodized aluminum oxide film can endure is somewhat related to its thickness within certain limits. I have found that anodic oxide films thinner than 0.0002 resist crazing even at remarkably high temperatures, in the range of 1100° Fahrenheit and higher, while anodic oxide films thicker than 0.0002 inch craze even at temperatures as low as 350° Fahrenheit. When films thicker than 0.0002 inch are employed the anodic oxide film cracks under the vitreous enamel and crazing or spalling results. Anodized films that are too thin will not afford adequate protection to an exposed aluminum surface. For most purposes I have found that exposed anodic films thinner than 0.00005 inch cannot be sealed to produce the desirable stable surface, however films that thin may accept a vitreous enamel coating and accordingly may be employed if completely coated with enamel.

The foregoing examples illustrate several specific modes for effecting the process of this invention. Since it is within the skill of the art to anodize aluminum by many methods including the use of various electrolytes, temperatures, current densities, times and other conditions, it is not necessary to treat exhaustively of the various anodizing techniques which may be employed, however, anodized aluminum surfaces obtained by other methods may be employed to form a suitable surface for a vitreous enamel coating. Similarly, sealing may be accomplished by many methods of hydrating the aluminum oxide film or by depositing different materials within it, and since various sealing processes are well known to the art, these also will not be treated exhaustively. It is intended that all methods of anodizing and sealing aluminum are included within the scope of and may be used in the process of this invention. The vitreous material intended for use in the process of this invention is any fusible glass-like substance that is capable of being glazed on aluminum at temperatures below about 1100° Fahrenheit. Many such fusible materials are known to the art and are generally referred to as frits or slips. A frit is usually the coarse mixture of materials suitable for being converted into a vitreous enamel while a slip is the finely ground and suspended form of a frit which may contain clay or other media to aid in suspending it in water. Many such slips or frits which are capable of bonding to aluminum are known to the art and it is intended that any of these may be employed in the process of this invention.

It is also intended within the scope of this invention to include aluminum alloys which are capable of having an anodic aluminum oxide finish electrolytically produced upon their surface. From the foregoing examples and specifications it is apparent that the process of this invention provides an improved method of coating aluminum with vitreous enamel thereby to produce a stable, decorative, heterogeneous surface which is a novel product heretofore not available.

I claim:

1. A method of coating aluminum with vitreous enamel which comprises electro-chemically producing an anodic aluminum oxide film having a thickness of from about 0.0002 to about 0.00005 inch on said aluminum, directly coating at least a portion of said film with a fusible vitreous material, and heating the coated film to at least the fusion temperature of said vitreous material.

2. A method of coating aluminum with vitreous enamel which comprises electro-chemically producing an anodic aluminum oxide film having a thickness of from about 0.0002 to about 0.00005 inch, pigmenting said film, sealing said pigmented film, directly coating at least a portion of said film with a fusible vitreous material, and heating the coated film to at least the fusion temperature of said vitreous material.

3. A method of coating aluminum with vitreous enamel which comprises electro-chemically producing an anodic aluminum oxide film having a thickness of from about 0.0002 to about 0.00005 inch, directly coating a portion of said film with a fusible vitreous material, heating the coated film to at least the fusion temperature of said vitreous material, dyeing the uncoated anodized aluminum surface, and sealing the dyed surface.

4. A method of coating aluminum with vitreous enamel which comprises electro-chemically producing an anodic aluminum oxide film having a thickness of from about 0.0002 to about 0.00005 inch, directly coating at least a portion of said film with a vitreous material which is fusible at a temperature of from about 950° Fahrenheit to about 1100° Fahrenheit and heating the coated film to the fusion temperature of said vitreous material.

5. An article comprising a sealed anodized aluminum surface from about 0.0002 to about 0.00005 inch thick partially coated with vitreous enamel fused directly to said anodized surface.

6. An article comprising a sealed colored anodized aluminum surface from about 0.0002 to about 0.00005 inch thick partially coated with vitreous enamel fused directly to said anodized surface.

7. An article comprising a sealed pigmented anodized aluminum surface from about 0.0002 to about 0.00005 inch thick partially coated with vitreous enamel fused directly to said anodized surface.

8. An article comprising a sealed dyed anodized aluminum surface from about 0.0002 to about 0.00005 inch thick partially coated with vitreous enamel fused directly to said anodized surface.

References Cited in the file of this patent

UNITED STATES PATENTS

| | | |
|---|---|---|
| 2,683,113 | Prance et al. | July 6, 1954 |
| 2,687,373 | Hering | Aug. 24, 1954 |
| 2,721,835 | Axtell | Oct. 25, 1955 |
| 2,812,295 | Patrick | Nov. 5, 1957 |

FOREIGN PATENTS

| | | |
|---|---|---|
| 325,471 | Switzerland | Dec. 31, 1957 |

Disclaimer 2,991,234.—*Joseph M. Andrus*, Evanston, Ill. ENAMELED ALUMINUM AND PROCESS FOR MANUFACTURE THEREOF. Patent dated July 4, 1961. Disclaimer filed Apr. 13, 1966, by the assignee, *Kaiser Aluminum & Chemical Corporation*.

Hereby enters this disclaimer to claims 1 and 4 of said patent.

[*Official Gazette May 24, 1966.*]